Jan. 12, 1932.   L. M. HARVEY   1,840,358
FRUIT CLIPPER
Original Filed April 3, 1928
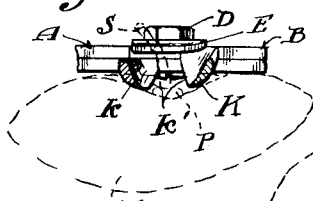
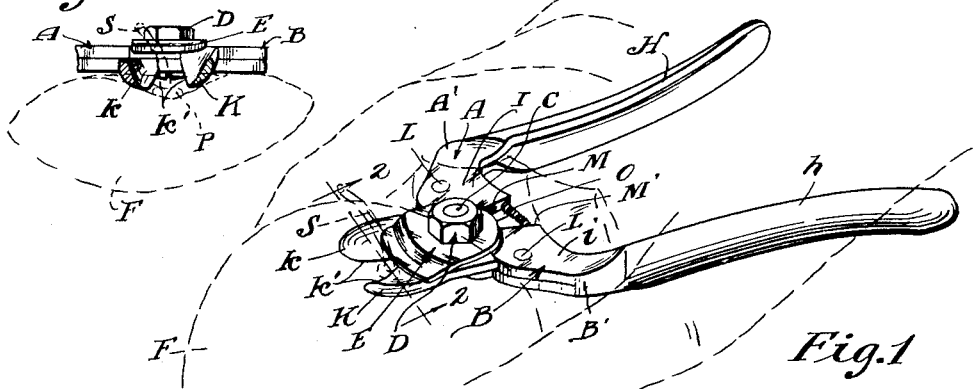
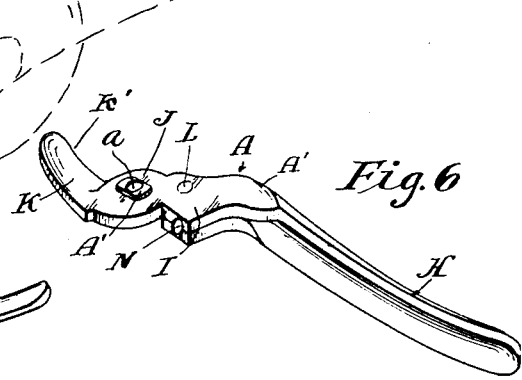
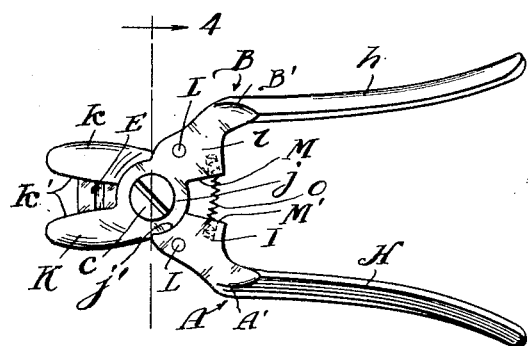
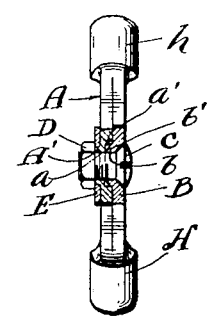
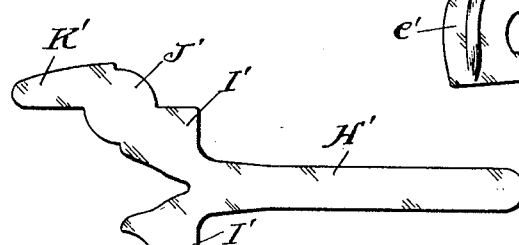
INVENTOR.
Leo M. Harvey
BY
ATTORNEYS.

Patented Jan. 12, 1932

1,840,358

UNITED STATES PATENT OFFICE

LEO M. HARVEY, OF LOS ANGELES, CALIFORNIA

FRUIT CLIPPER

Application filed April 3, 1928, Serial No. 266,949. Renewed June 17, 1931.

This invention relates to fruit clippers, of the general character of such devices shown in Letters Patent granted to me Oct. 30, 1923, No. 1,472,397.

The principal object is to provide a new and improved fruit clipper embodying certain improved methods and means of forming the same, whereby the same are more peculiarly adapted for the purpose of clipping the fruit from the trees so that the stems will be cut slightly above the pit of the fruit.

The particular object of invention is to provide a fruit clipper having the general form of a pair of pliers, comprising a pair of pivotally mounted members of substantially like form and character detachably held together in such a manner that the pivot screw or pin may not be worn by the continued use of the device.

Another object is to provide a device of the character mentioned, in which the two pivoted members are formed of sheet metal in a stamping operation and are bent and folded over so that substantially thickened portions may be provided at points adjacent the axis of the hinge joint, the folded portions being welded together for providing rigidity and strength at such points, so that the members may be uniformly hardened throughout the area thereof, and may be made in a stamping operation and at a low manufacturing cost.

Another object is to provide in said two pivoted members means concentric with the hinge pin or screw embodying a cavity formed in one of the members and a boss formed on the other member projecting into said cavity for pivotally holding said members together while the hinge pin or screw serves to prevent the accidental or unintentional separation of said members.

Another object is to provide said pair of pivotally connected members with handles on one of their ends and co-operating cupped jaws with cutting edges on the other ends thereof, together with a detachably held and stationary stop member projecting forwardly over the jaws and spaced from said cutting edges for engagement with the stems of the fruit so as to properly position the stems with respect to the cutting jaws in the fruit clipping operation.

Other objects may appear as the description progresses.

I have shown in the accompanying drawings the preferred embodiment of my invention, in which Fig. 1 is a perspective view of my improved device shown in full lines, with the hand of an operator and a fruit, such as an orange, properly positioned with respect to the pliers, for the operation thereof in clipping the fruit, the hand and the orange being shown in broken lines.

Fig. 2 is an end view of the same as seen on line 2—2 of Fig. 1.

Fig. 3 is a bottom plan view of the assembled device.

Fig. 4 is a transverse section of the same on line 4—4 of Fig. 3.

Fig. 5 is a blank formed of sheet metal from which the two pivoted members of the device are formed in a stamping operation.

Fig. 6 is a perspective view typical of both of the pivoted members subsequent to a forming operation.

Fig. 7 is a plan view as seen from the top of the stop or limiting member.

As shown in the drawings, my improved device embodies the pair of pivotally connected members A and B pivotally and detachably held together by means of a screw C and a nut D, and serving to stationarily hold the stop or limiting member E on the upper side of the member A. The members A and B have handles H and $h$ respectively formed thereon of substantial length and of arcuate cross section with substantially thickened portions I and $i$ at the inner extremities of said handles, which connect with hinge portions J and $j$ from which extend cutting jaws K and $k$ respectively.

Referring to Fig. 5, it will be noted that the members A and B are first formed of sheet metal in a stamping operation by providing a flat blank having portions H′, I′, I′, J′, and K′ corresponding to the portions H, I, J and K of the member A and to the portions $h$, $i$, $j$ and $k$ of the member B. The blank shown in Fig. 5 is subsequently formed in a forming operation by bending the blank into the form shown in Fig. 6 so that the portions I, I' will be brought into snug contact and into registration with each other for providing thickened portions rearwardly of and adjacent to the hinge portions J and j, while the portions H' are formed into an arcuate cross section, as shown in Figs. 1 and 6.

In the same operation, the cutting jaws K and k are properly formed from the portions K' and the blank is perforated and otherwise formed as hereinafter described in the same forming operation.

Thereafter the portions I', I' which form the portions I and i of the two members are welded together at one or more points, as at L, by a spot welding operation or otherwise.

The members A and B are perforated at a and b respectively to receive the stem of the screw C, while one of the members is counter-sunk on its outer side to receive the counter-sunk head of said screw. The member A is provided with a cavity a' of larger diameter than the screw C and concentric with the perforation a therein, which is adapted to pivotally receive a boss B' formed on the lower side of the member B, as shown in Fig. 4. The member A has an elongated lug A' formed on the upper side thereof and centrally of the portion J which is adapted to receive and stationarily hold the limiting member E thereon beneath the nut D. The member E has an aperture e therein which conforms to the boss A' so that the member E will be properly positioned on the members A and B for engagement with the stem, as at S, of the fruit F.

In this connection, it may be stated that for different uses, particularly for use in connection with different kinds and sizes of fruit, the members E may be varied in size so that they are replaceable on the members A and B. To this end the apertures e in the members E and the boss A' on the member A may be correspondingly formed for varying the position of the members E with respect to the stems S of the fruit.

The portions I and i of the members A and B are provided with shoulders M and M' respectively, which are opposed to each other on opposite sides of the longitudinal axis of the clippers, and said portions also have bores, as at N, formed therein to receive the ends of a compression spring O, by means of which the cutting jaws K and k are normally held open.

With particular reference to Fig. 2, it will be observed that the cutting jaws K and k are correspondingly cupped so that their upper sides will be concave and their lower sides convex. Thus the jaws of the device are adapted to fit into the pit, as at P, of the fruit for clipping the stems S thereon.

The stop E has a flat rear portion E' and a downwardly bent front portion e' which is disposed in the cup of the jaws for engagement with the stems of the fruit, but is elevated substantially above the adjacent cutting edges k', k' of said jaws.

It will be noted that the cutting jaws K and k are bent downwardly at their edges k' from the plane of the portions J and j, while said last mentioned portions are pivotally held together and are of the normal thickness of the blank shown in Fig. 5. One of the portions I', of which the portions I are formed, is disposed in the plane of the other portion J or j, as the case may be, and is curved at j' for pivotal engagement with the portion j, as shown in Fig. 3.

In operation, the device is assembled as shown in Fig. 1 and is adapted to be held in the hand with the concave surfaces of the jaws K and k uppermost. The points at which the handles H and h joint the portions I and i of the members A and B respectively, are so formed that when grasped in the hand, as shown in Fig. 1, the hump or point on the member A will rest slightly forwardly of the second finger, while the corresponding point on the member B will rest under the thumb of the hand. When so held, the first finger and thumb are free for use as an index or guide by means of which the device may be positioned on the fruit F so that the normally spaced jaws K and k will move into cutting position on the opposite sides of the stem S.

When the device is so positioned on the fruit, pressure on the handles H and h against the tension of the spring O will move the jaws K and k into contact with, and will serve to cut, the stem S at a point slightly above the pit P of the fruit. In this operation the convex lower surfaces of the jaws conform substantially to the curve of the pit so that the stems may be cut as close to the surface of the pit as possible.

It will be noted that the flare of the handles H and h and the humps A' and B' at the inner extremities thereof provide a convenient form for holding in the hand, as shown in Fig. 1, so that the clippers may not be easily displaced from the hand during a clipping operation. Also, the arcuate cross sectional form of the handles provides a convenient and comfortable shape of handle so that the continued use of the clippers will not be hurtful or tiresome.

In the consideration of this invention, attention is particularly called to the method of forming the separable units from flat sheet metal in a stamping operation in such a manner that as convenient and comfortable a form for such members is provided as could be provided with cast metal members, and the cost of production is substantially less than it could be with forged or cast metal members.

It may be also observed that inasmuch as it is desirable to case harden the members A and B the hardening can be more uniformly done with sheet metal of uniform thickness than could be done with cast metal of variable thickness, and devices formed from sheet metal are less subject to breakage and points of weakness than when otherwise formed.

When the members A and B are formed in a press, as shown in Fig. 6, with the portions I', I' bent over each other into close contact, the welding of said portions together serves to as effectively unite said portions as if they were formed in a casting operation as a single portion. As hereinabove stated, this welding operation may be accomplished at one or more spots, as may be found desirable and expedient.

While I am aware that other devices for this purpose have been heretofore patented, in addition to the patent hereinabove described granted to me, it will be understood that I have provided distinct and valuable improvements in the art of fruit clippers which not only make for greater utility and comfort, but also facilitate the fruit cutting operations.

What I claim is:

1. A fruit clipper comprising a pair of pivotally connected members having jaws and handles, means for pivotally connecting said members including a screw for pivotally supporting one of the members on the other and threaded into said other member, a boss formed on said threaded member and encompassing said screw, a stop plate having an aperture for receiving said boss and detachably held on said boss, and a nut on said screw engaging and for retaining said stop plate in operative position.

2. A fruit clipper comprising a pair of pivotally connected sheet metal members having flat surfaces provided with telescoping hinge portions, handles and cutting jaws extended in opposite directions from the hinge, means for normally holding the jaws spread apart, a boss on the outer surface of one of said hinge portions, and a stop plate having an aperture for receiving said boss, said stop plate projecting over said jaws, and means for supporting all of said members in position for use.

3. A fruit clipper comprising a pair of pivoted members having cooperating clipping jaws formed on adjacent ends thereof, and a stop member mounted externally of one of said members to limit the insertion of an object between the jaws, the member adjacent said stop member having a boss projecting outwardly therefrom, said stop member having an aperture formed to correspond to and adapted to seat on said boss for preventing the turning of the stop member when the device is operated.

LEO M. HARVEY.